United States Patent
Malik

(10) Patent No.: US 6,574,316 B1
(45) Date of Patent: *Jun. 3, 2003

(54) METHOD AND SYSTEM FOR PRESERVING TELEPHONE NUMBERS

(75) Inventor: Dale W. Malik, Dunwoody, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/222,924

(22) Filed: Aug. 19, 2002

Related U.S. Application Data

(63) Continuation of application No. 09/333,035, filed on Jun. 15, 1999, now Pat. No. 6,463,136.

(51) Int. Cl.$^7$ .......................... H04M 15/00; H04M 3/42
(52) U.S. Cl. .............. 379/111; 379/112.08; 379/114.28; 379/121.03; 379/201.02
(58) Field of Search ........................... 379/111, 114.01, 379/114.28, 114.29, 115.01, 120, 121.01, 121.03, 121.06, 125, 127.01, 127.03, 127.06, 130, 201.01, 201.02, 201.08, 207.02

(56) References Cited

U.S. PATENT DOCUMENTS

| | | |
|---|---|---|
| 5,666,405 A | 9/1997 | Weber |
| 5,701,301 A | 12/1997 | Weisser, Jr. |
| 5,771,282 A | 6/1998 | Friedes |
| 6,122,357 A | 9/2000 | Farris et al. |
| 6,282,274 B1 | 8/2001 | Jain et al. |

*Primary Examiner*—Binh Tieu
(74) *Attorney, Agent, or Firm*—Shaw Pittman LLP

(57) ABSTRACT

The present invention allows a global telephone number be assigned to a first outbound-only telephone line connected to a first service switching point (SSP) to be also assigned to a second outbound-only telephone line connected to a second service switching point. The global telephone number can be used as many times as there are service switching points within a single area code region. In a preferred embodiment, in which an outbound-only telephone line subscriber also has a regular telephone line, all calls originated from the subscriber's outbound-only telephone line can be billed against the account of the subscriber's regular telephone line. The invention also allows multiple outbound-only telephone lines be billed against the account of a single regular telephone line. In addition, the invention also allows a subscriber of a regular telephone line that is used substantially or exclusively for outbound-only purposes to convert the regular telephone line into an outbound-only telephone line, thereby allowing the telephone number to reuse the global telephone number for an converted outbound-only telephone line.

20 Claims, 8 Drawing Sheets

METHOD AND SYSTEM FOR PRESERVING TELEPHONE NUMBERS

This is a continuation application that claims the benefit of U.S. patent application Ser. No. 09/333,035, filed Jun. 15, 1999, which is incorporated by reference in its entirety.

BACKGROUND

1. Field of Invention

The present invention relates generally to telecommunication systems and more particularly to a method and system for preserving telephone numbers by eliminating the need for assigning a unique telephone number for each and every telephone line in service.

2. Background of the Invention

The expansion of telecommunications services and equipment such as telephones, fax machines, pagers, cellular telephones, and modems, has resulted in a rapid growth in the demand for telephone numbers. In addition, the Internet has created a further demand for an even greater number of telephone numbers.

In the United States alone, new telephone numbers are increasing at a rate of about 12% per year, while the population is growing at a rate of only about 4%. This phenomenon is due in part to many subscribers often having multiple telephone numbers. For example, one person could well have as many as six telephone numbers: a first number for a home telephone, a second number for a home fax machine, a third number for an office telephone, a fourth number for an office fax machine, a fifth number for a cellular telephone, and a sixth number for a pager. A seventh number might be necessary if he or she chooses to have dedicated Internet access. In addition to the above-described personal demand for telephone numbers, certain commercial entities, such as telemarketers, are also adding more telephone numbers for their businesses.

Under the current infrastructure of United States telecommunication systems, a telephone number is required for every telephone line in service. A person with, e.g., six telephone lines would therefore have six telephone numbers. A telemarketing company with 50 telephone lines may have 50 telephone numbers. The assignment of a specific telephone number to a specific telephone line is necessary because the telephone number serves as an "address" for the corresponding telephone line. The telephone number also identifies the caller as the person to whom the telephone company would charge the associated telecommunication services.

The ten-digit telephone number system of the United States contains three main components: the first three digits are the "area code," the next three digits are the "exchange code," and the remaining four digits specify a particular telephone line. The area code identifies the general geographical areas of the United States. For example, all telephone lines with the "202" area code are located physically in Washington, D.C. Similarly, all telephone numbers with the "404" area code are physically located in the Atlanta area of Georgia. Within each area code, there are multiple exchange codes. For example, within the geographical boundaries served by the "404" area code, there are many active exchange codes including, e.g., "659," "249," "628," "444," and "680." Also within each area code, there is one or more exchange codes that have been reserved from being issued to subscribers. In the "404" area code region, for example, reserved exchange code "203" is not available for assignment of telephone numbers. If this reserved exchange code were to be made available for telephone number assignment, then up to 10,000 additional telephone numbers would be available for telephone line subscribers located within the "404" area code region. These telephone numbers would range sequentially from "404-203-0000" to "404-203-9999."

The conventional solution to satisfy the demand for even more telephone numbers (as thousands of telephone lines are being put to service every day) is to add new area codes. Each new area code adds 1,000 additional exchange codes. As explained above, each additional exchange code adds 10,000 telephone numbers. As a result, the addition of one new area code provides 10,000,000 additional telephone numbers. This conventional solution, however, has many disadvantages. For example, the introduction of multiple area codes in a single city requires complex operation overhead, and could result in consumer confusion, as well as result in additional expenses to the telephone company. Furthermore, we could eventually run out of the three-digit area codes which would then create the need for creating four-digit or larger area codes.

FIG. 1 is a schematic diagram of an advanced intelligent network structure. Advanced intelligent network structures are described in U.S. Pat. No. 5,701,301, which is hereby incorporated by reference. In the example shown in this schematic diagram, Subscriber A has a regular telephone line 10 that is capable of two-way communications, namely, initiating and receiving communications. Regular telephone line 10 has been assigned a unique telephone number, e.g., "404-777-1000." Subscriber B of regular telephone line 20 has been issued a different unique telephone number, e.g., "404-888-2000." These subscriber data, along with other subscriber data such as their billing rates and mailing addresses, are contained in customer record database 12. Customer record database 12 can easily update service management system (SMS) 13 to enable changes in service control point (SCP) 14a's data. In a preferred embodiment, telephone line 10 also has either an off-hook immediate or an off-hook delay trigger assigned to it.

When Subscriber A dials "404-888-2000" using a telecommunication device 1 such as a telephone that is connected to regular telephone line 10, a service switching point (SSP) 11 is triggered via, e.g., an off-hook immediate trigger, to send query 17 to a service control point 14a via a signaling transfer point (STP) 15 of the SS7 signaling system provided with the advanced intelligent network. Query 17 contains information such as Subscriber A's unique telephone number "404-777-1000" (calling party ID number) and the recipient's unique telephone number "404-888-2000" (dialed number) as well as the originating point code of service switching point 11, e.g., "252-112-001." In essence, query 17 is a question from service switching point 11 asking service control point 14a how to process the telephone call. When service control point 14a receives query 17, it consults database (DB) 14b that in turns recognizes "404-777-1000." As a result, service control point 14a responds to query 17 with instruction 18 directing service switching point 11 to route the call to Subscriber B. Normal processing of the call from Subscriber A to Subscriber B would require that Subscriber A's telephone number be used for billing purposes and be recorded at SSP 11, along with Subscriber B's telephone number as the destination address. In addition, either subscriber may establish communication with Internet service provider (ISP) 16 or Internet service provider 26 by dialing "404-123-4567" or "404-765-4321," the unique telephone numbers of Internet service provider 16 and Internet service provider 26, respectively.

In summary, routing a call requires a unique destination address and an originating billing information to properly complete the call.

SUMMARY OF THE INVENTION

The present invention recognizes that not all telephones lines are being used to both initiate and terminate communications. For example, an increasing number of subscribers use additional telephone lines for outbound-only purposes such as access to the Internet. Many corporations use telephone lines exclusively for making outbound-only calls, e.g., telemarketing calls. As these telephone lines do not receive calls, they do not require unique telephone numbers to serve as addresses. As long as a method exists for the telephone company to identify the calling party for billing purposes, several outbound-only telephone lines could be assigned the same telephone number within a single area code.

The telecommunication system of the present invention allows a single telephone number to be used repeatedly for multiple outbound-only telephone lines located within a common area code region. For example, in an area code region with 50 service switching points, a single global telephone number from the group of "404-203-XXXX," where XXXX ranges from "0000" to "9999," can be used 50 times, i.e., each service switching point could use the same global telephone number to serve a single outbound-only telephone line. In this example of 50 service switching points, the present invention allows for up to 500,000 outbound-only telephone lines (10,000 global telephone numbers within each service switching point times 50 service switching points) within that area code. In a preferred embodiment where an outbound-only telephone line subscriber has a regular telephone line, the unique telephone number of the regular telephone line can be used for billing purposes of the outbound-only telephone line.

The present invention also allows multiple outbound-only telephone lines to be billed against a single unique telephone number. For example, Company A served by a first service switching point has a regular telephone line with unique telephone number "404-249-7000." Company A might also have three outbound-only telephone lines with global telephone numbers of "404-203-7001," "404-203-7002," and "404-203-7003." Calls from all three outbound-only telephone lines can be billed against unique telephone number "404-249-7000." As explained above, global telephone numbers "404-203-7001," "404-203-7002," and "404-203-7003" can also be reassigned to other outbound-only telephone lines connected to a service switching point other than the first service switching point. Similarly, any one of the 10,000 global telephone numbers used by the first service switching point can be reused by any one outbound-only telephone line served by any other service switching points.

In a preferred embodiment, all calls from a given outbound-only telephone line can be billed against its subscriber's regular telephone line account. Referring now to FIG. 2, consider the example of two subscribers, namely, Subscriber A and Subscriber B, who both reside within a geographical region served by area code "404" for which exchange code "203" has been reserved. Subscriber A has a unique telephone number of "404-777-1000" connected to a first service switching point (SSP) 11, and Subscriber B has a unique telephone number of "404-888-2000" connected to a second service switching point 21. Both subscribers have an outbound-only telephone line with the common global telephone number of "404-203-1111." When Subscriber A attempts to use her outbound-only telephone line 30 for the first time, service switching point 11 sends a query 37 to a service control point (SCP) 14a through service transfer point (STP) 15. Query 37 contains the global telephone number "404-203-1111" and the originating point code, e.g., "252-112-001," of service switching point 11. Similarly, when Subscriber B attempts to use his outbound-only telephone line 40 for the first time, service switching point 21 sends a query 47 to service control point 14 containing the originating point code of the second service switching point 21, e.g., "100-211-252," and the "404-203-1111" global telephone number.

After receiving either of these two queries, service control point 14a instructs the appropriate service switching point to ask its subscriber for his or her unique telephone number for billing purposes. For example, if the query comes from Subscriber A, service control point 14a would send an instruction 38 to service switching point 11 and Subscriber A would key in her unique telephone number "404-777-1000." Following Subscriber A's authorization, any subsequent calls made by Subscriber A using her outbound-only telephone line 30 would cause service control point 14a to charge those calls against Subscriber A's unique telephone number "404-777-1000." Similarly, following the initial setup, all calls originating from Subscriber B's outbound-only telephone line 40 would be billed against Subscriber B's unique telephone number "404-888-2000."

Accordingly, it is an object of the present invention to provide a telecommunication method and system where a single telephone number can be used to service as many outbound-only telephone lines as there are service switching points within a common area code region.

It is a further object of the present invention to utilize existing reserved exchange codes to serve thousands of outbound-only telephone lines and thereby eliminate the need for telephone companies to put new area codes into service.

It is a still further object of the present invention to allow telephone companies to offer substantially lower rates for subscribers of outbound-only telephone lines.

It is yet another object of the present invention to provide a telecommunication system where the need for complex operation overhead can be reduced.

DETAILED DESCRIPTION OF THE INVENTION

Figure 1:
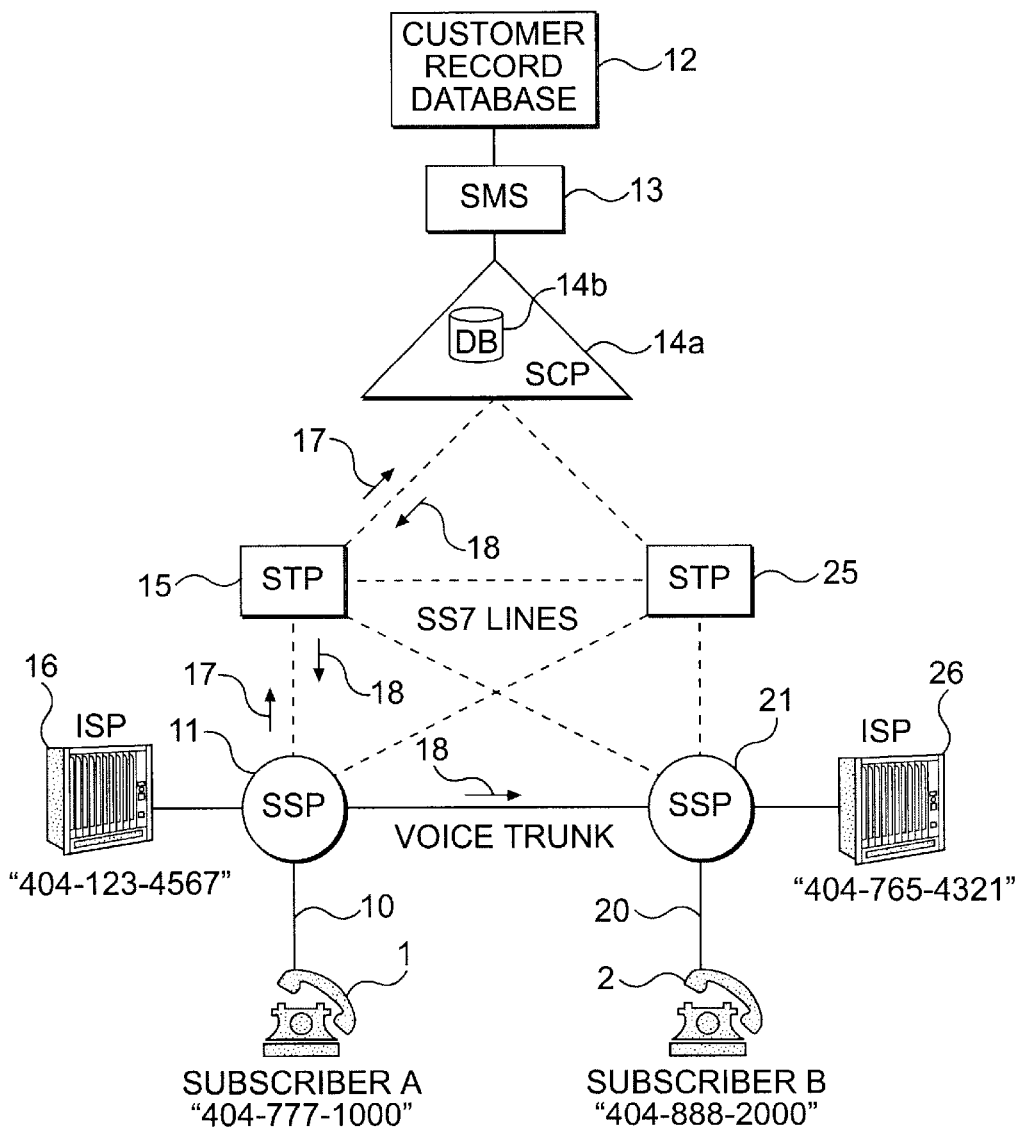
FIG. 1 is a schematic diagram of an advanced intelligent network telephone system.
Figure 2:
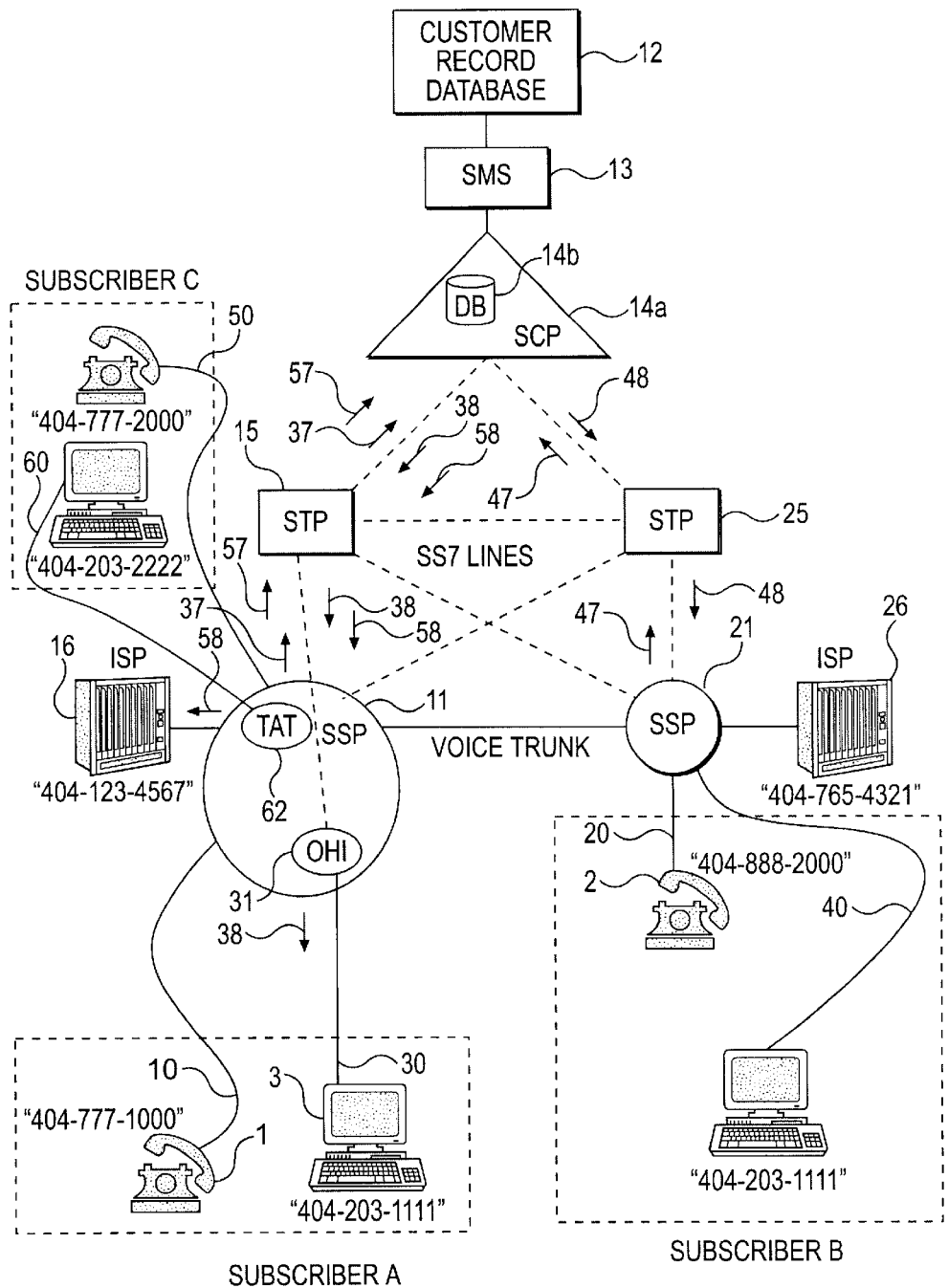
FIG. 2 is a schematic diagram showing a preferred embodiment of the present invention illustrating two subscribers of outbound-only telephone lines with an identical global telephone number.

FIG. 2 is a schematic diagram showing a preferred embodiment of the present invention. In FIG. 2, Subscriber A also has an outbound-only telephone line 30 in addition to regular telephone line 10. In this preferred embodiment, outbound-only telephone line 30 is equipped with an off-hook immediate (OHI) trigger 31, and it has a global telephone number, e.g., "404-203-1111" assigned to it. In a different embodiment, an off-hook delay trigger may be used instead of the off-hook immediate trigger. The "404-203-1111" global telephone number is call "global" because it can be assigned more than once within a common area code region. For example, Subscriber B has subscribed to an outbound-only telephone line 40 that also has the same global telephone number, e.g., "404-203-1111" assigned to it. One of ordinary skill in the art might observe that global telephone number "404-203-1111" may not be assigned to Subscriber C's outbound-only telephone line 60 because that particular global telephone number has already been assigned to another telephone line connected to service switching point (SSP) 11, namely, Subscriber A's outbound-only telephone line 30. Database (DB) 14b has all the information regarding Subscribers A, B, and C, their regular telephone lines' unique telephone numbers, and their outbound-only telephone lines' global telephone numbers.

When Subscriber A attempts to initiate a call using outbound-only telephone line 30 for the very first time by using a telecommunication device 3, off-hook immediate trigger 31 causes service switching point 11 to issue a transaction capability application part (TCAP) message 37 to service control point (SCP) 14a that in turn queries database 14b to determine the appropriate response to message 37. Similarly, when Subscriber B attempts to use his outbound-only telephone line 40 for the very first time, service switching point 21 sends query 47 to service control point 14a containing the global telephone number "404-203-1111" number and the originating point code of service switching point 21. After consulting database 14b, service control point 14a sends instruction 48 that is similar to instruction 38, and Subscriber B would provide his "404-888-2000" unique telephone number to verify database 14b and add the originating point code to database 14b. Following this set up, each subsequent call by Subscriber B using outbound-only telephone line 40 would be billed against Subscriber B's "404-888-2000" unique telephone number. Similarly, all calls from Subscriber A's outbound-only telephone line 30 subsequent to the set up would be considered pre-authorized by Subscriber A to be billed against the account of "404-777-1111."

As there are only two service switching points shown in the example of FIG. 2, the global telephone number "404-203-1111" can only be used twice. In practice, global telephone number "404-203-1111," or any one of 10,000 global telephone number from the group of "404-203-XXXX" where XXXX ranges sequentially from "0000" to "9999," can be used as many times as there are service switching points in the geographical area served by "404" area code. For example, if there are seven service switching points in the "404" area code region, then up to 70,000 outbound-only telephone lines can be made available, with each of the 10,000 "404-203-XXXX" global telephone numbers serving seven different subscribers from seven different service switching points.

As shown in FIG. 2, Subscriber A could use her outbound-only telephone line 30 to call Subscriber B's regular telephone line 20, Subscriber C's regular telephone line 50, Internet service provider (ISP) 16, and Internet service provider 26. However, should Subscriber A try to use his outbound-only telephone line 30 to call Subscriber C's outbound-only telephone line 60, that call would fail because Subscriber C is unable to receive calls using her outbound-only telephone line 60. Subscriber A would attempt to be connected to the telephone number in their switch only.

In a preferred embodiment, the telephone company might place a terminating attempt trigger (TAT) 62 on outbound-only telephone line 60. In such an embodiment, when service switching point 11 receives a request to terminate a circuit to outbound-only telephone line 60, terminating attempt trigger 62 will interrupt the call. Service control point 14a can then be programmed to disallow the termination attempt to outbound-only telephone line 60. Also, in the preferred embodiment of the present invention, when a subscriber dials any of "404-203-XXXX" global telephone numbers, a message from service control point 14a could announce that the dialed "404-203-XXXX" telephone number does not receive in-coming calls. Alternatively, the message could include the telephone number of the subscriber's telephone line that does receive incoming calls.

In a different embodiment where a subscriber always uses his outbound-only telephone line to call a specific Internet service provider, that subscriber can request the telephone company to specify that each time the service control point receives a query from the subscriber's service switching point, the service control point would always instruct the service switching point to route the call to the predetermined Internet service provider. For example, if Subscriber A in FIG. 2 uses her outbound-only telephone line 30 to call Internet service provider 16 exclusively, then the system can be programmed such that each time off-hook immediate trigger 31 is triggered, a query 57 from service switching point 11 would cause service control point 14a to respond with instruction 58 for service switching point 11 to route the call from outbound-only telephone line 30 to Internet service provider 16.

Figure 3:
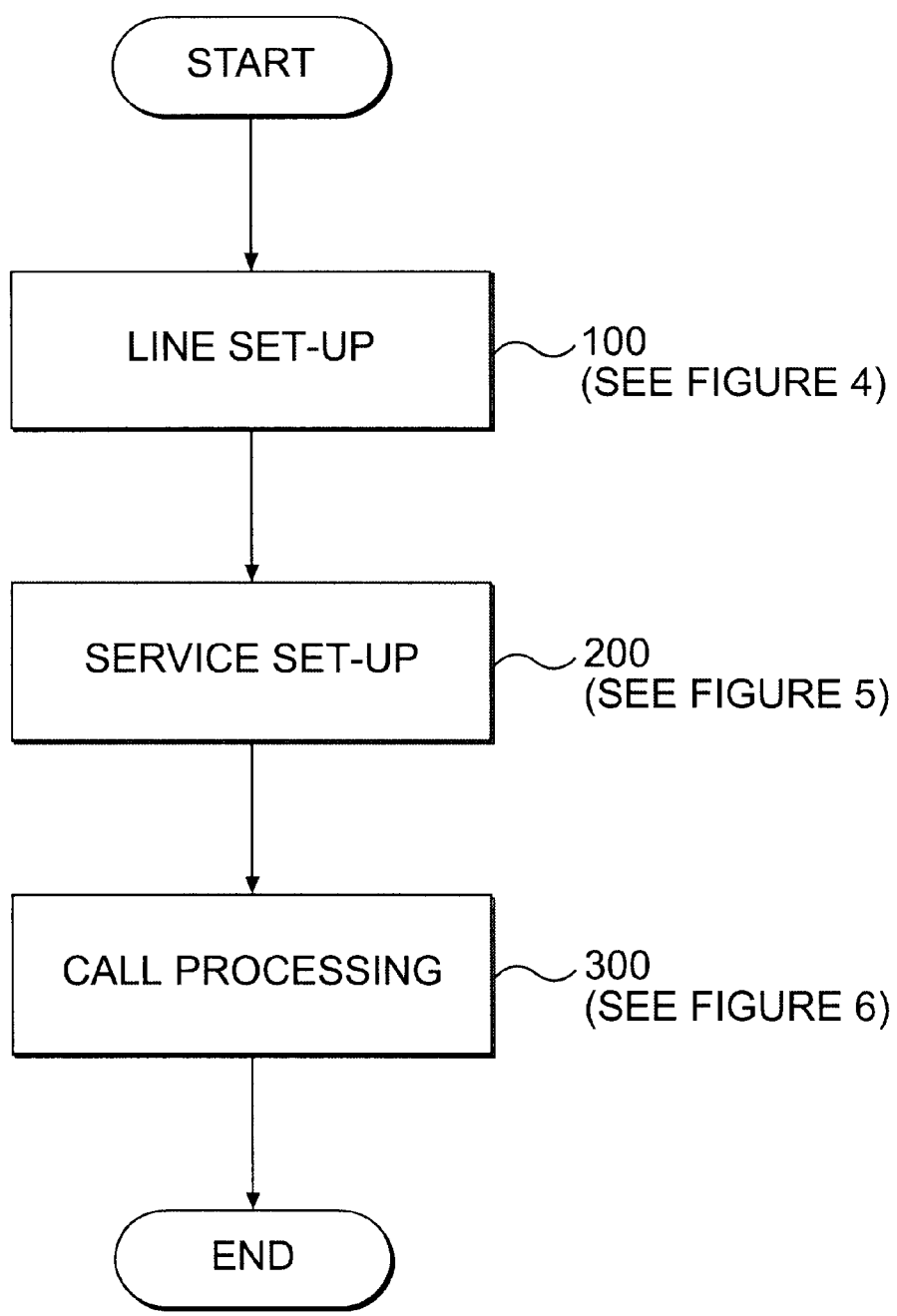
FIG. 3 is a flowchart showing the three stages of the present invention.

FIG. 3 is a flowchart of the sequence of events undertaken by a preferred embodiment of the present invention previously described in FIG. 2. As shown in FIG. 3, the establishment and maintenance of the present invention involves three stages, namely, Line Set-Up 100, Service Set-Up 200, and Call Processing 300. Line Set-Up Stage 100 includes the steps required to provision the line. Service Set-Up Stage 200 includes the steps required to ensure a proper billing system is established. The final stage, Call Processing Stage 300, includes the steps required to complete the call. In any embodiment of this invention, Line Set-Up Stage 100 and Service Set-Up Stage 200 need only be performed once. Call Processing Stage 300, however, will be performed each time an outbound-only telephone line subscriber initiates a call.

Figure 4:
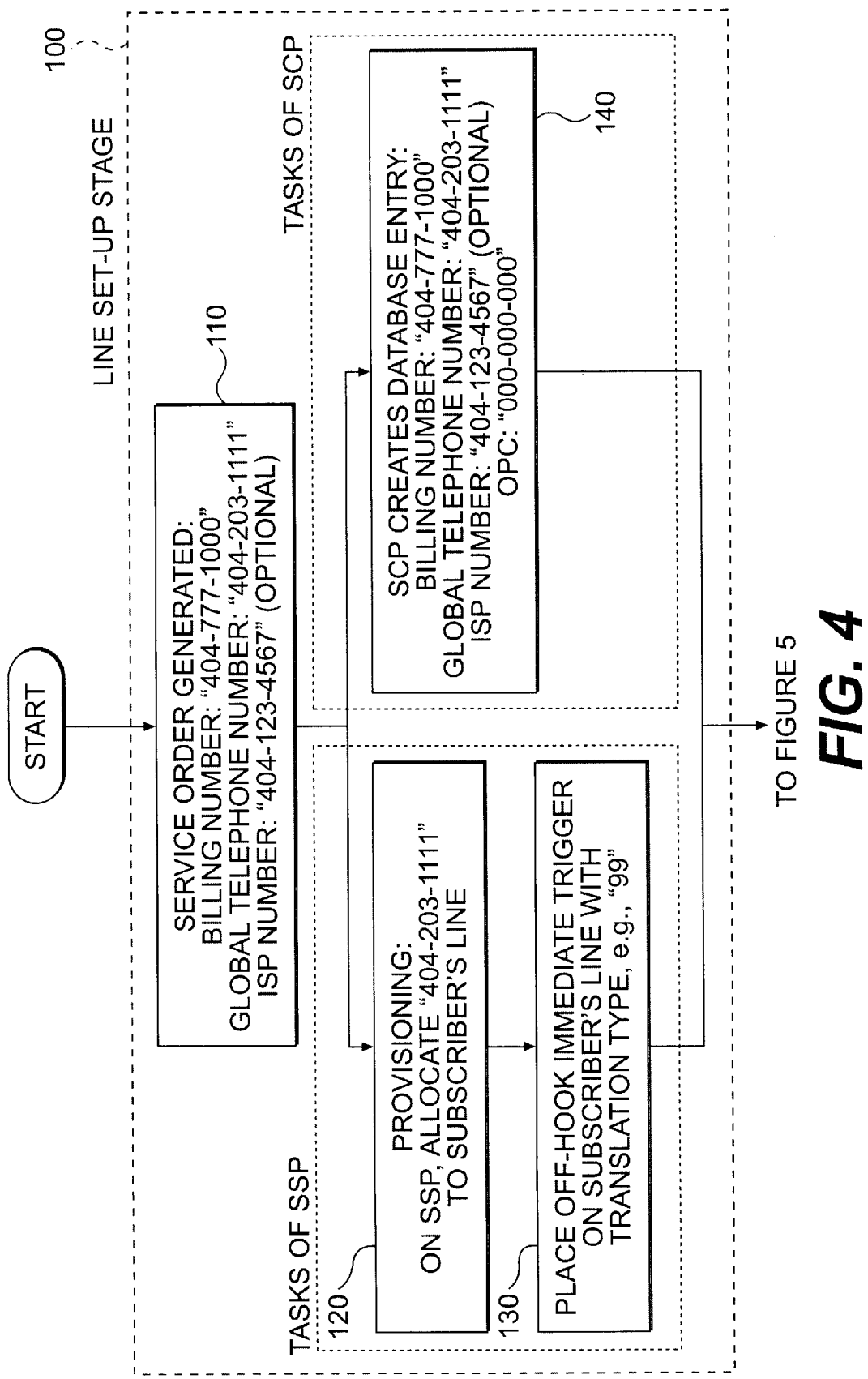
FIG. 4 is a flowchart showing the Line Set-Up Stage of the present invention.

FIG. 4 is a flowchart showing the details of Line Set-Up Stage 100. As shown in FIG. 4, when a subscriber calls the business office of the telephone company to order an outbound-only telephone line in step 110, the telephone company generates a service order. The service order generated by the telephone company includes the subscriber's billing number and the global telephone number to be assigned to that subscriber's new outbound-only telephone line. In the example of Subscriber A in FIG. 2, the billing number is Subscriber A's regular telephone number "404-777-1000," and the global telephone number assigned is "404-203-1111." In a preferred embodiment in which the subscriber wishes to route all calls from the outbound-only telephone line to a specific Internet service provider, the service order will also include the telephone number of the Internet service provider. In the example of Subscriber A, Internet service provider 16's telephone number "404-123-4567," will be provided. In provisioning step 120, the service order directs the service switching point to assign the subscriber's outbound-only telephone line a global telephone number. In Subscriber A's case, the global telephone number "404-203-1111" is assigned to her outbound-only telephone line 30 which is physically connected to Subscriber A's home.

In step 130, in a preferred embodiment, the telephone company places an off-hook immediate trigger on the outbound-only telephone line and assigns a translation type, e.g., "99," to this off-hook immediate trigger. Alternatively, an off-hook delay trigger may be used instead. In step 140, the service order directs the service control point to create a database entry containing the subscriber's unique telephone number for billing purposes of the outbound-only telephone line, the newly assigned global telephone number, and if appropriate, the Internet service provider's telephone number. Specifically, for this example, the database entry would include the following entries: the billing number would be Subscriber A's unique telephone number "404-777-1000," the global telephone number would be "404-203-1111," the Internet service provider number would be "404-123-4567," and a space for originating point code to be added later.

Figure 5:
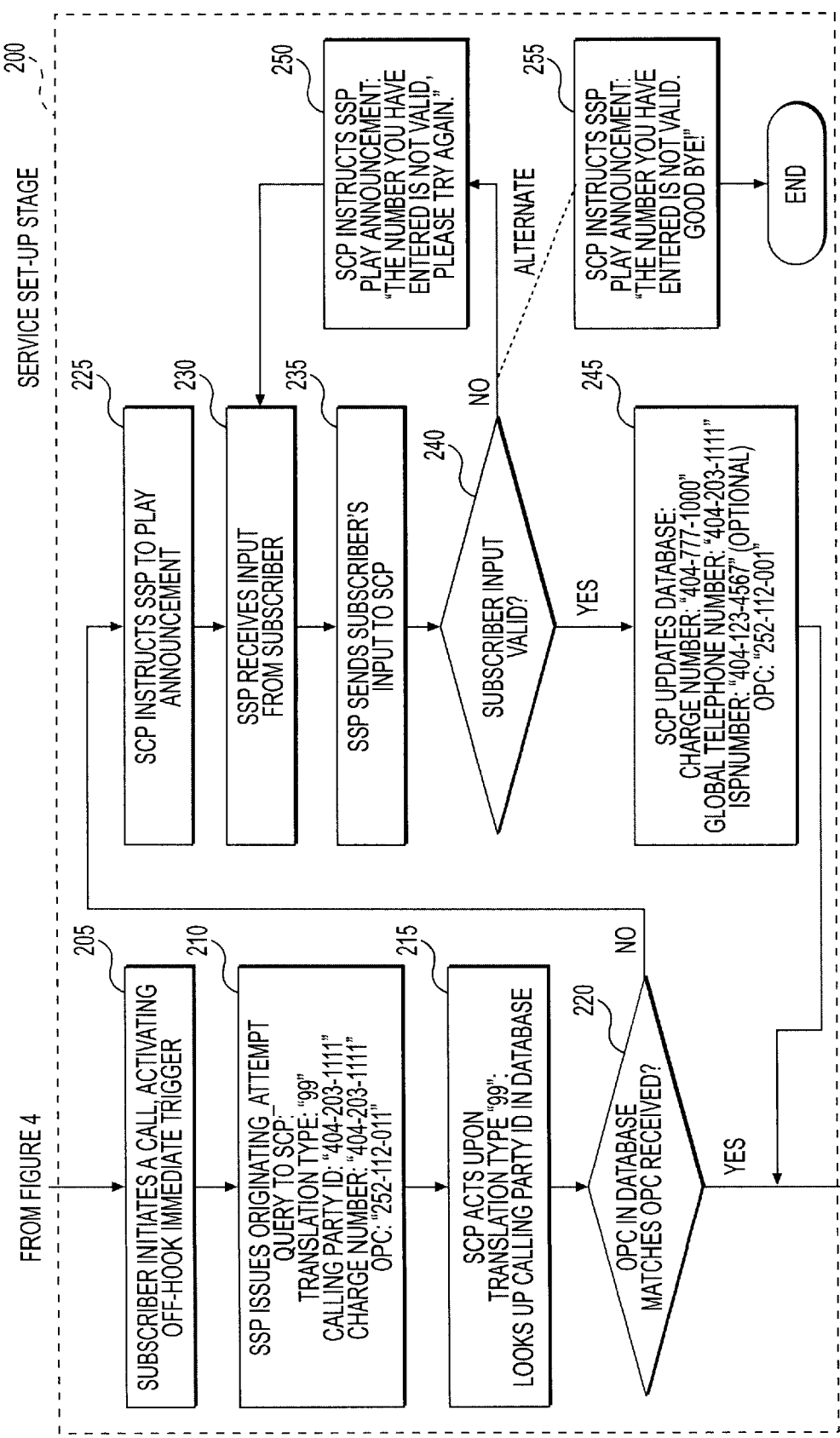
FIG. 5 is a flowchart showing the Service Set-Up Stage of the present invention.

FIG. 5 describes the steps involved in Service Set-Up Stage 200. When the subscriber initiates a call in step 205 using the outbound-only telephone line, the off-hook immediate trigger prompts the service switching point to interrupt call processing and issue an Originating_Attempt query to the service control point. The query includes standard information such as the calling party identification, charge number, translation type and originating point code of the service switching point. As shown in step 210, the values for these parameters in the example of Subscriber A described above are as follows: TranslationType="99"; CallingPartyID="404-203-1111"; ChargeNumber="404-203-1111"; and originating point code (OPC)="252-112-001."

In step 215 when the service control point receives the query containing TranslationType of "99," the service control point looks up the CallingPartyID in the database. The service control point then compares the originating point code entry corresponding to the CallingPartyID with the originating point code received. If the originating point codes match in step 220, the service control point proceeds to the Call Processing Stage 300. If the originating point codes do not match, it means that this subscriber's outbound-only telephone line has not been set up previously. In that case, the service control point proceeds to step 225 to set up the service.

In step 225, the service control point instructs the service switching point to play an announcement to the subscriber requesting the additional information. For example, the announcement might be "Please enter your unique telephone number, followed by the pound sign." When the subscriber responds as instructed, the service switching point receives the outpulsed digits entered by the subscriber in step 230 and sends them to the service control point in step 235. The service control point then verifies, in step 240, whether the billing number entered is valid, i.e., it matches an existing billing number assigned to a regular telephone line service. In database 14b, if the number is valid, the service control point updates the database to include the originating point code of the service switching point in step 245. Otherwise, the service control point instructs the service switching point to play another announcement, in step 250, to inform the subscriber of the error. As shown in FIG. 5, in one embodiment of the present invention the subscriber could be allowed to try again as she did in step 230. Alternatively, in another embodiment, the system could hang up as in step 255.

Figure 6:
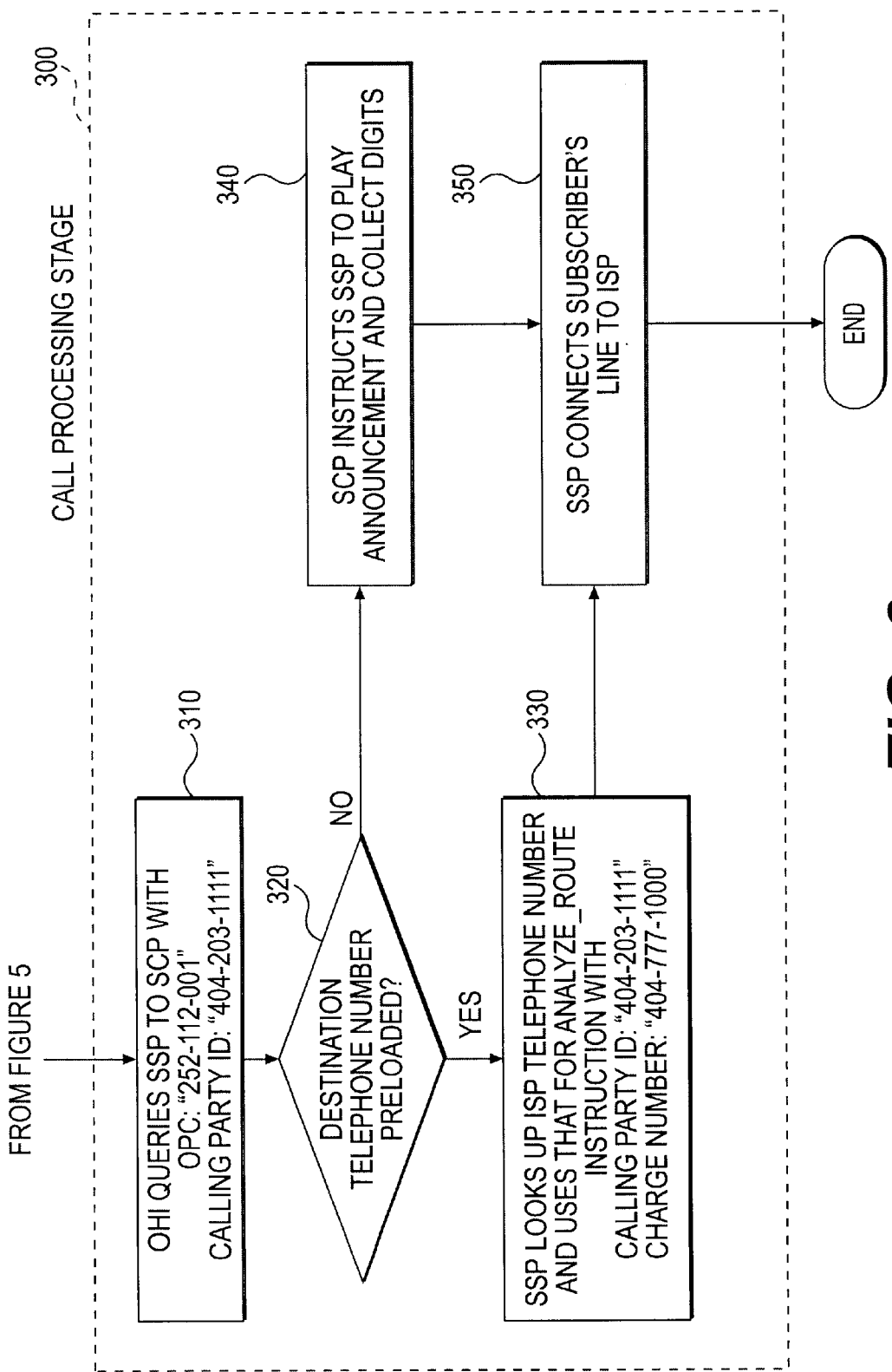
FIG. 6 is a flowchart showing the Call Processing Stage of the present invention.

FIG. 6 illustrates the steps involved in Call Processing Stage 300. In step 310, the query contains, among other data, the originating point code and the calling party identification. Upon verifying the billing information in the database in step 320, the service control point responds to the query by sending an Analyzed_Route Command with the destination telephone number in step 330. In this response, the service control point inserts the billing and calling party information stored in the database in place of the information supplied by the service switching point. In the example of Subscriber A in FIG. 2, service switching point 11 is instructed that the proper ChargeNumber is "404-777-1000." In a preferred embodiment, if in step 320 a destination telephone number has been preloaded, such as "404-123-4567," the service control point inserts the preloaded destination telephone number stored in the database as the destination of the call. Again, as in the example of Subscriber A in FIG. 2, service switching point 11 would instructed to dial the number "404-123-4567." In step 330, the service switching point connects the subscriber's outbound-only telephone line to the Internet service provider and bills the charge number as supplied by the service control point. In a different embodiment in which the destination number has not been preloaded, the service switching point plays an announcement in step 340 so that the subscriber could enter the called party's telephone number, and the service switching point collects the digits provided by the subscriber.

Figure 7:
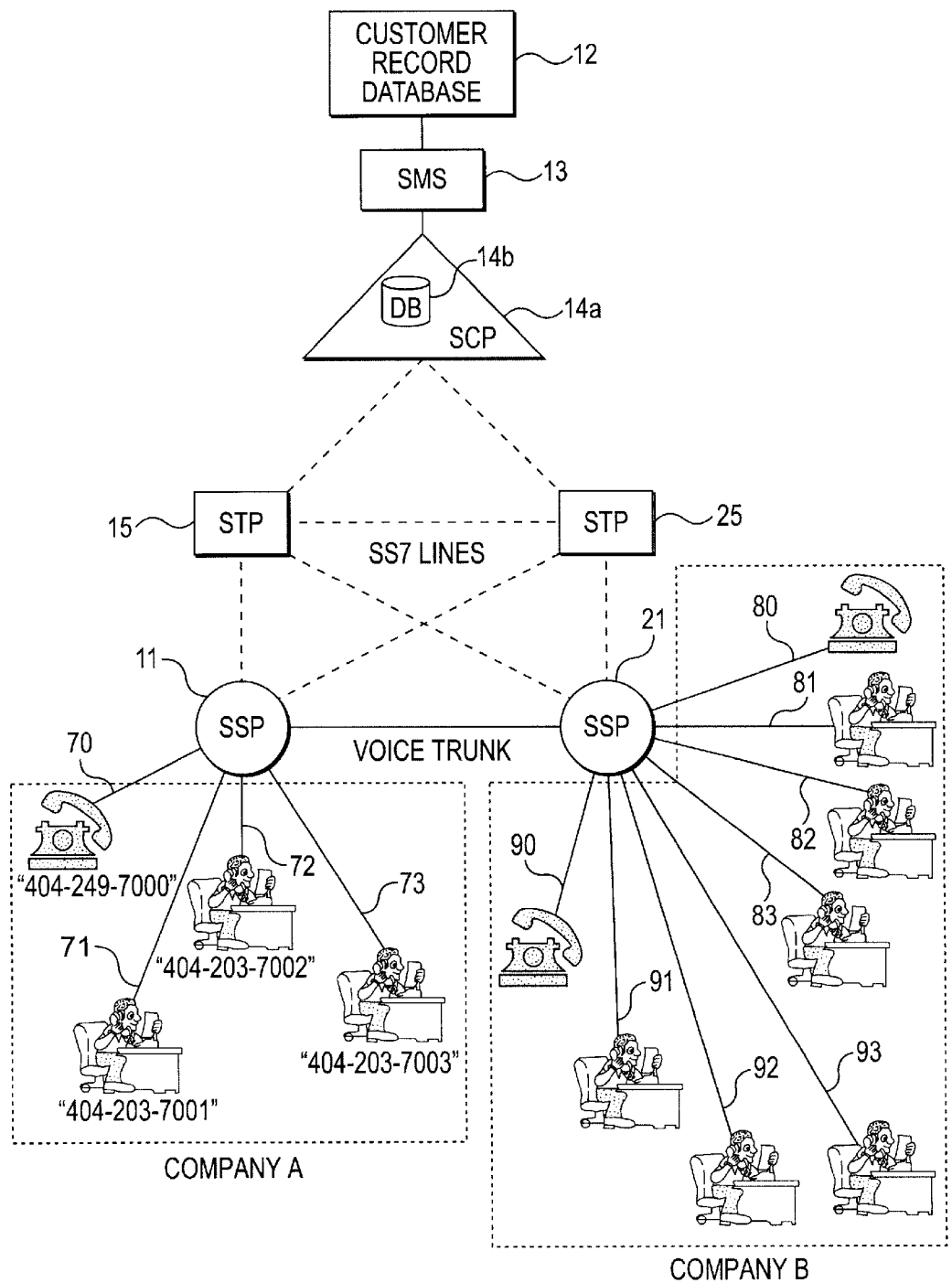
FIG. 7 is a schematic diagram showing another preferred embodiment of the present invention illustrating one subscriber having multiple outbound-only telephone lines and one regular telephone line.

FIG. 7 shows a different embodiment of the present invention suitable for corporations subscribing to multiple lines for telemarketing purposes. In this embodiment, Company A subscribes to one regular telephone line 70 with unique telephone numbers "404-249-7000" and three outbound-only telephone lines, namely outbound-only telephone line 71, outbound-only telephone line 72, and outbound-only telephone line 73, with global telephone numbers of "404-203-7001," "404-203-7002," and "404-203-7003," respectively. In this embodiment, every call from any one for this group of three outbound-only telephone lines can be charged against the "404-249-7000" unique telephone number account. For companies with more than one regular telephone lines, similar arrangements can be made. For example, as shown in FIG. 7, Company B has two regular telephone lines, namely regular telephone line 80 and regular telephone line 90. Company B also has multiple outbound-only telephone lines where calls from outbound-only telephone line 81, outbound-only telephone line 82, outbound-only telephone line 83 are charged against regular telephone line 80, and calls from outbound-only telephone line 91, outbound-only telephone line 92, and outbound-only telephone line 93 can be billed against Company B's regular telephone line 90 account. Global telephone numbers "404-203-7001," "404-203-7002," and "404-203-7003," that have previously been assigned to outbound-only telephone line 71, outbound-only telephone line 72, and outbound-only telephone line 73, respectively, can be used again for outbound-only telephone line 81, outbound-only telephone line 82, and outbound-only telephone line 83 in any combination. After being used once in service switching point (SSP) 21, they may not be used again for outbound-only telephone line 91, outbound-only telephone line 92, or outbound-only telephone line 93.

In the specific example above, where Company A and Company B collectively subscribe to a total of 12 telephone lines (three regular telephone lines and nine outbound-only telephone lines), only nine telephone numbers have been issued because each of the global telephone numbers "404-203-7001," "404-203-7002," and "404-203-7003" is used twice. The saving of telephone numbers will be greater as the number of service switching points increases within the advanced intelligent network. The present invention allows calls from more than three outbound-only telephone lines to be billed against a single regular telephone line account. The example described above does not limit scope of the invention.

Figure 8:
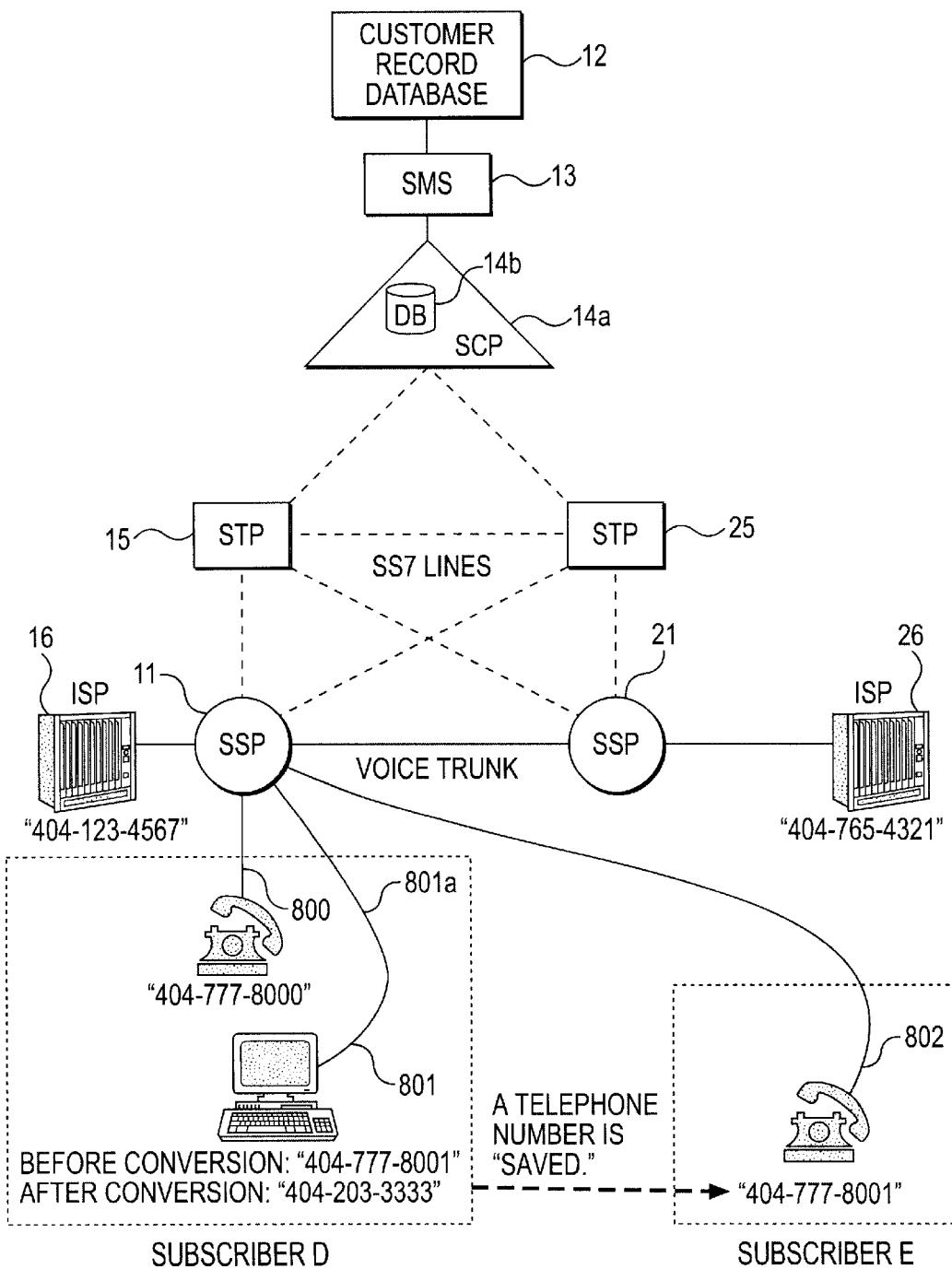
FIG. 8 is a schematic diagram showing another preferred embodiment of the present invention illustrating how a telephone company can buy back telephone numbers from subscribers of regular telephone lines that are used primarily for outbound-only purposes.

FIG. 8 represents another embodiment of the present invention demonstrating the re-use of telephone numbers. In the example shown in FIG. 8, Subscriber D has two regular telephone lines, namely regular telephone line 800 and regular telephone line 801, with unique telephone numbers of "404-777-8000" and "404-777-8001" assigned to them, respectively. Subscriber D, however, dedicates regular telephone line 801 exclusively for outbound-only calls to Internet service provider (ISP) 16. Subscriber D only receives calls using her regular telephone line 800. In this situation, telephone number "404-777-8001" is practically "wasted" in light of the present invention. As a result, the telephone company could offer to convert regular telephone line 801 to an outbound-only telephone line 801a for Subscriber D with an incentive, e.g., a lower subscription fee. If Subscriber D agrees, the telephone company can convert regular telephone line 801 to an outbound-only line 801a that functions like outbound-only telephone line 30 described in FIG. 2. Following the conversion, the new outbound-only telephone line 801a may use a global telephone number "404-203-XXXX," e.g., "404-203-3333" that has not been used elsewhere within service switching point (SSP) 11. As explained above, this global telephone number "404-203-3333" could be reused elsewhere within the advanced intelligent network for a telephone line connected to a service switching point other than service switching point 11. The conversion of regular telephone line 801 to outbound-only telephone line 801a results in the saving of unique telephone number "404-777-8001." The unique telephone number "404-777-8001" can be used elsewhere, for example, as the unique telephone number for regular telephone line 802 of Subscriber E. The identification of subscribers, such as Subscriber D, can be done by means including, but not limited to, a survey, an analysis of how subscribers use their telephone lines, an offer of outbound-only telephone lines at lower subscription rates, and various promotional campaigns through the media.

The foregoing disclosure of embodiments and specific examples of the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A telephone network comprising:
   a first service switching point;
   a first outbound-only telephone line connected to the first service switching point;
   a second service switching point; and
   a second outbound-only telephone line connected to the second service switching point,
   wherein the first outbound-only telephone line and the second outbound-only telephone line share a global telephone number.

2. The network of claim 1, wherein each of the first service switching point and the second service switching point is associated with an area code.

3. The network of claim 2, wherein the global telephone number comprises the area code.

4. The network of claim 3, the global telephone number is assigned to a finite number of outbound-only telephone lines, wherein the finite number equals a number of service switching points associated with the area code.

5. The network of claim 1, wherein the first service switching point is associated with a first exchange code, the second service switching point is associated with a second exchange code, and the global telephone number is associated with a third exchange code.

6. The network of claim 5, wherein the third exchange code is different from each of the first exchange code and the second exchange code.

7. A method for assigning telephone numbers comprising the steps of:
   receiving a request for a new telephone number for a first outbound-only telephone line;
   determining an identity of a first service switching point associated with the first outbound-only telephone line; and
   assigning a global telephone number to the first outbound-only telephone line, wherein the global telephone number is assigned to two or more outbound-only telephone lines.

8. The method of claim 7, wherein the global telephone number is assigned to a second outbound-only telephone line associated with a second service switching point.

9. The method of claim 8, wherein the first service switching point and the second service switching point are located within a geographical area identifiable by an area code, wherein the global telephone number comprises the area code.

10. The method of claim 9, wherein the global telephone number is assigned to a finite number of outbound-only telephone lines, wherein the finite number is determined by a number of service switching points within the geographical area.

11. The method of claim 8, wherein the first service switching point is associated with a first exchange code, the second service switching point is associated with a second exchange code, and the global telephone number is associated with a third exchange code.

12. The method of claim 11, wherein the third exchange code is different from the first exchange code and the second exchange code.

13. The method of claim 11, wherein the third exchange code is same as one of the first exchange code and the second exchange code.

14. A method for assigning telephone numbers comprising the steps of:
   allocating a block of global telephone numbers for outbound-only telephone lines;
   receiving a first request for a new telephone number for a first outbound-only telephone line;

determining an identity of a first service switching point associated with the first outbound-only telephone line;

assigning a first global telephone number to the first outbound-only telephone line;

receiving a second request for a new telephone number for a second outbound-only telephone line;

determining an identity of a second service switching point associated with the second outbound-only telephone line; and assigning the first global telephone number to the second outbound-only telephone line if the second service switching point is different from the first service switching point.

15. The method of claim 14, further comprising the step of assigning a second global telephone number to the second outbound-only telephone line if the second service switching point is also the first service switching point.

16. The method of claim 15, wherein the first global telephone number and the second global telephone number share a common area code and a common exchange code.

17. The method of claim 14, wherein each global telephone number of the block of global telephone numbers comprises an area code and an exchange code.

18. The method of claim 14, wherein all global telephone numbers of the block of global telephone number share an area code.

19. The method of claim 14, wherein all global telephone numbers of the block of global telephone numbers share an exchange code.

20. The method of claim 14, wherein each global telephone number of the block of global telephone number is assigned to a finite number of outbound-only telephone lines, wherein the finite number is determined by a number of service switching points.

* * * * *